US007065655B1

(12) United States Patent
Jakobsson

(10) Patent No.: US 7,065,655 B1
(45) Date of Patent: Jun. 20, 2006

(54) SECURE ENCLOSURE FOR KEY EXCHANGE

(75) Inventor: Bjorn Markus Jakobsson, Hoboken, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1007 days.

(21) Appl. No.: 09/717,513

(22) Filed: Nov. 21, 2000

(51) Int. Cl.
*G06F 11/30* (2006.01)
*G06F 12/14* (2006.01)
*H04L 9/32* (2006.01)

(52) U.S. Cl. ............... 713/194; 713/171; 340/550; 380/271; 361/816; 361/817; 361/818; 324/156; 324/627; 324/628

(58) Field of Classification Search ........... 713/171, 713/168, 194; 235/380, 382; 380/283, 271; 455/411; 340/550; 361/816–818; 324/156, 324/627, 628
See application file for complete search history.

(56) References Cited

U.S. PATENT DOCUMENTS

| 4,575,621 | A | * | 3/1986 | Dreifus | 235/380 |
| 4,910,090 | A | * | 3/1990 | Kuhlman et al. | 428/469 |
| 4,915,222 | A | * | 4/1990 | Reidinger et al. | 206/709 |
| 5,063,273 | A | * | 11/1991 | Bloks | 174/35 R |
| 5,080,096 | A | * | 1/1992 | Hooper et al. | 607/30 |
| 5,177,791 | A | * | 1/1993 | Yeh et al. | 380/45 |
| 5,479,341 | A | * | 12/1995 | Pihl et al. | 700/79 |
| 5,550,529 | A | * | 8/1996 | Burge | 340/5.6 |
| 5,602,536 | A | * | 2/1997 | Henderson et al. | 340/5.23 |
| 5,799,083 | A | * | 8/1998 | Brothers et al. | 380/239 |
| 5,887,063 | A | * | 3/1999 | Varadharajan et al. | 713/172 |
| 5,892,367 | A | * | 4/1999 | Magee et al. | 324/760 |
| 6,181,284 | B1 | * | 1/2001 | Madsen et al. | 343/702 |
| 6,292,898 | B1 | * | 9/2001 | Sutherland | 713/200 |
| 6,657,214 | B1 | * | 12/2003 | Foegelle et al. | 250/506.1 |
| 6,766,160 | B1 | * | 7/2004 | Lemilainen et al. | 455/411 |

* cited by examiner

*Primary Examiner*—Ayaz Sheikh
*Assistant Examiner*—Pramila Parthasarathy

(57) ABSTRACT

A method is disclosed comprising placing a first device in an enclosure, placing a second device in the enclosure, sealing the enclosure, and after sealing the enclosure, causing the first device to exchange a key with the second device. After the key exchange, the first and second devices can be taken out of the enclosure and can use the key to communicate with each other securely and in an authenticated manner. The devices may be electronic devices or optical devices. The enclosure prevents electromagnetic radiation of a certain bandwidth from escaping and thus prevents an adversarial device from eavesdropping on communication between the first and second devices. The enclosure may include a filtering material such as a metal net. The enclosure may be, for example, a plastic bag or a glass container. The user may prepare two devices for a communication, such as a key exchange, by setting the two devices in a transfer mode, which may start the key exchange by a timer in one of the devices, then place them in the container, and seal the container. When the devices have finished the communication such as a key exchange, this fact may be signaled by sound or in some other manner by the devices. The container may have a separate compartment for each device and the compartments may be separated by a separation device such as a door comprised of filtering material. When both compartments are properly closed, the users may open the door allowing the two devices to discover each other and communicate or exchange encryption keys. The container may include a Bluetooth or other transmitter, connected to the outside world by means of cord device. The cord device may plug into a device outside of the container with which a key exchange is desired. A portable device is also disclosed in the form of for example, a floppy disc or a PCMCIA card.

27 Claims, 8 Drawing Sheets

SECURE ENCLOSURE FOR KEY EXCHANGE

FIELD OF THE INVENTION

This invention relates to improved methods and apparatus of preventing an individual or device from eavesdropping on communications between two other devices.

BACKGROUND OF THE INVENTION

A man-in-the-middle attack (or middle-person attack) is an attack in which an adversarial device "inserts itself" between first and second victim devices which are attempting to communicate. The adversarial device makes the first and second victim devices believe that they communicate with each other, while they in fact communicate with the adversarial device, and the adversarial device relays messages between the first and second victim devices. Such an attack allows the adversarial device to read the communication between the two victim devices and to alter and insert messages that each of the two victim devices will believe came from the other victim device. It allows an adversarial device to eavesdrop on encrypted data without breaking the encryption scheme if he mounts an attack during the key establishment protocol (which is the phase of the communication when the two victim devices select the key to be used for encryption.)

To date, only one type of defense has been proposed to prevent this type of attack, and it involves the use of public key cryptography, and requires the use of a certification infrastructure. This, in turn, forces users into trust relationships with a certification authority, and requires substantial computational resources on behalf of the devices performing key exchange. While consumer computers can perform the type of operations needed without any problem, less powerful and less costly devices will not. For example, it is not certain that cellular phones will have the capability, and it is almost certain that cordless headsets for phones will not. Therefore, current methods prevent a large number of products from performing such a safe key exchange (as exemplified by a recent attack on Bluetooth by the author of this application.) A second problem, not related to computational power, is that even if the two victim devices do have sufficient computational resources to perform a public-key based exchange, it is difficult for humans to ascertain that the public keys delivered in fact match the device with which the key exchange should occur. For example, if two cell phone users wish to exchange a key, how could one user know the user identifier of the other person? (While naming, e.g., "John Doe" helps, it may not suffice, as there may be several John Does, and users have a difficult time detecting small typographical differences, such as distinguishing "John Doe" from "Jon Doe").

Even worse, if one of the devices does not have an operator, the identification process becomes more difficult. For example, if a visitor to a cyber café wishes to establish a secure connection with a printer in the store, should he trust the name "printer", "Starbucks printer", or "Starbucks printer"? (Phrases "Starbucks printer" and "Starbucks printer" differ in that the first has one space in between the two words and the second has two spaces). If another café visitor names his phone any of the previous, there is a severe risk for a man-in-the-middle attack. Therefore, even if all devices were powerful enough to perform a public-key supported key exchange, human error might open up vulnerabilities.

It has been shown for the case involving Bluetooth that the use of PINs does not guarantee to solve the above problem, either. If too long PINs are used, the risk for human error or bad PINs increases. If short PINs (anything less than 20–30 digits) are used, then so-called dictionary attacks can be mounted on the key exchange.

SUMMARY OF THE INVENTION

The present invention in various embodiments provides protection against an adversarial device inserting itself between two victim devices and intercepting communication between them. A method is disclosed comprising placing a first device in an enclosure, placing a second device in the same enclosure, sealing the enclosure, and after sealing the enclosure, causing the first device to communicate with the second device. The first and second devices may exchange a key while the two devices are in the enclosure. The key may be any type of key such as a public key (or asymmetric key) or a secret (symmetric key), while a secret key may be preferred. When the first and second devices are taken out of the enclosure, the two devices may be able to communicate with one another with the use of the key in a way that allows authentication and encryption. Generally, authentication is when a first device can convince a second device (for example) that the first device was the sender or originator of a message received by the second device. This could be achieved by means of digital signatures (based on symmetric cryptography), Message Authentication Codes (MACs, based on symmetric crypto) and potentially other not yet discovered methods, all of which require a key to be exchanged beforehand. Generally, encryption is a method that allows a first device to send a message to a second device in a way that allows the second device to determine what the message is, but prevents (or significantly inhibits) any third party device from determining what the message is. Encryption is made possible by the first and second devices having exchanged a key. Both encryption and authentication may involve more than two devices, but the capabilities of all devices are restricted by whether they have knowledge of the keys involved in the transformations.

The first and second devices may be, for example, electronic, optical, and/or wireless devices which may communicate in a manner well understood in the art but depending on the nature of the devices in question. A timer may be set before the devices are placed in the enclosure and this timer may later cause communication between the devices after the enclosure is sealed. The timer may be located, for example, in or on the first or the second electronics device.

Embodiments of the present invention employ the principle of a Faraday's cage. A Faraday's cage was typically previously used to prevent electromagnetic radiation from reaching objects inside the cage. Depending on the size of the holes in the Faraday's cage different wavelengths are let through, while others are not. The principle of a Faraday's cage has also been used for micro-wave ovens to focus radiation on the food and to prevent harmful electromagnetic radiation from escaping the inside of the microwave oven. Micro-wave ovens typically have metal walls and a fine-masked metal grid attached to the window for this purpose. The principals of a Faraday's cage have also been employed in certain opera houses (where a metal grid is built into walls), etc., where cell phones are made non-functional by being cut off from the cell phone towers. The principle has not been employed to enable two or more devices to communicate, while preventing others from eavesdropping on them.

In embodiments of the present invention a container employing principles of the Faraday's cage prevents electromagnetic radiation originating inside the cage from communicating devices from reaching outside of the cage. In this manner a potential adversarial device outside the cage cannot eavesdrop of the communications of two devices inside the cage. Two devices can thus exchange keys without an adversarial device determining the key.

In one embodiment a thin metal-coated plastic bag is provided. The user may prepare two devices for a key exchange (by setting them in a transfer mode, which may start the key exchange by a timer in one of the devices) and may place them in the plastic bag and zipping the bag closed with an airtight seal (which may be of the type used for zip-bags, or may be closed by other means). When the devices have finished the key exchange, this fact may be signaled by sound or in some other manner by the devices. The key exchanged is guaranteed to be secure, independently of the strength and type of cryptographic method in the key exchange. A secure key means that the key remains secret to the two devices, unless either of the two devices further discloses the key to other devices. Such a secret key can be used for purposes of encryption and/or authentication.

In another embodiment the devices are placed in a glass or transparent plastic container. The container includes a metal net similar to that of a microwave oven. The filtering effect of the metal net should have the same bandwidth as that of a Bluetooth device. A "Bluetooth device" as known in the art may be for example a phone or other device with wireless capability to communicate to for example wireless headsets. Embodiments of the present invention would work with any wireless key exchange protocol, and in particular when the devices are "Bluetooth" devices. One or more embodiments of the present invention would also work with other devices not only "Bluetooth devices". A user can again insert two or more devices, seal the container with a cover and then initiate by a timer or in some other manner a key exchange after sealing.

In a third embodiment of the present invention a container is provided comprised of two compartments. Each compartment is separated from each another by a separation device, such as a dividing door, or a metal net clad wall, that is mobile or is able to be opened. Two devices are inserted, each one being in the mode in which they search for a device to partner with and exchange keys with (no timer is typically needed in this embodiment). When both compartments are properly closed, the users may open the dividing door (without opening the container), allowing the two devices to discover each other and exchange keys as above.

In a fourth embodiment of the present invention a container, which may be similar to those containers previously described, may contain a Bluetooth or other transmitter, connected to the outside world by means of cord device. The cord device may be comprised of for example an electrical cord, an optical cable, a radio transmitter on the outside of the container but connected to the inside the container, or other devices. The cord device may plug in to a device outside of the container with which a key exchange is desired. The device outside the container may be set in standby mode until the device inserted into the container is safely within the container after which the device in the container may start the key exchange. There may be a switch which determines whether a key exchange is started and it may either be in the outside device or simply on the cord connecting the inside transmitter with the outside device. The device that was inserted into the container as a result is enabled to exchange a key with the device outside of the container, where the key is transported via the cord device.

In a fifth embodiment, a portable device of a type which may be somewhat similar to that described for the fourth embodiment, except that no cord is used. The portable device could have the shape of a floppy disc and be able to be fit in and read by a floppy disc drive or the portable device could have the shape of a PCMCIA card. The portable device may have two modes of operation. In the first mode, the portable device may locate (by means of a standard Bluetooth device which is integrated in it) another Bluetooth device (in or a part of a second device), and the portable device may perform a key exchange in a secure enclosure with the second device. In a second mode, the portable device may be physically connected to a third device and the portable device may communicate this key to the third device. For example, the third or fixed device may be a disc drive or a device resembling a disc drive which may read a portable device such as a floppy disc or a Bluetooth device with the shape of a floppy disc. The third or fixed device may be a PCMCIA port while the first device may be a PCMCIA card. Other designs, fitting a card to a parallel or serial port may also be used.

DETAILED DESCRIPTION OF THE DRAWINGS

Figure 1:
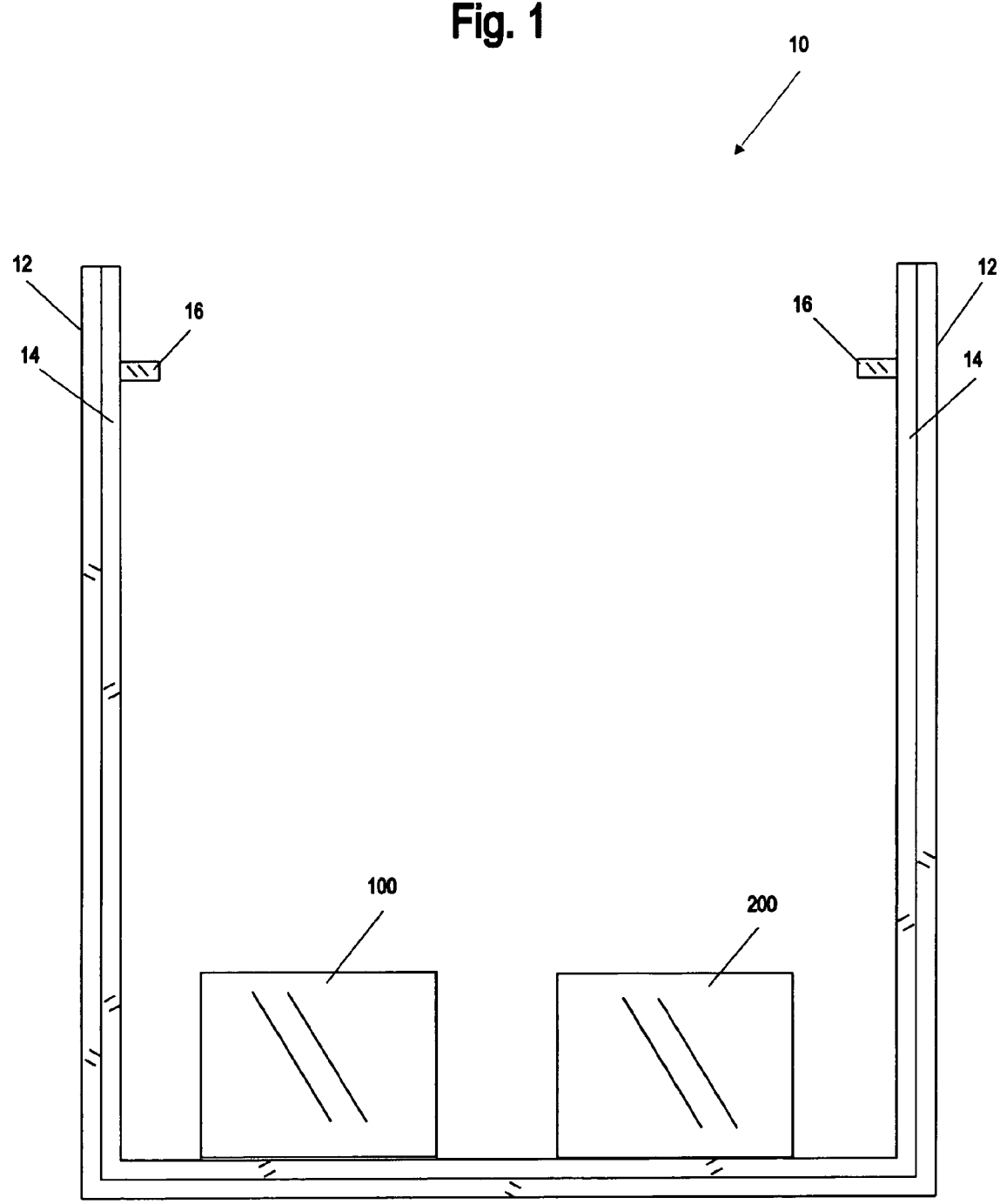
FIG. 1 shows a cross-sectional view of a first embodiment of a secure enclosure for allowing a key exchange between two devices.
Figure 2:
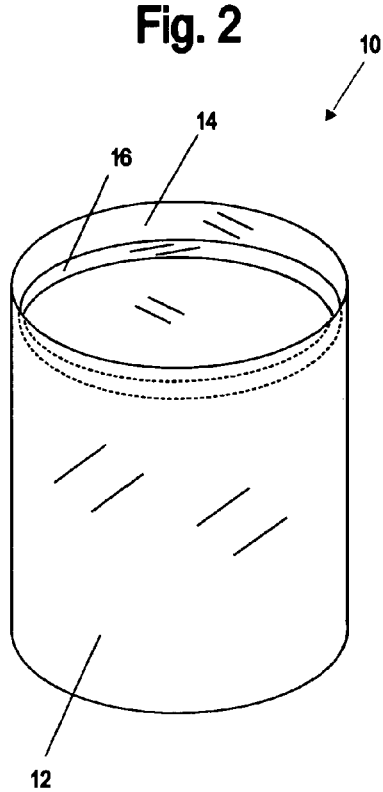
FIG. 2 shows a perspective view of the secure enclosure of FIG. 1.

FIG. 1 shows a cross sectional view of a secure enclosure 10. FIG. 2 shows a perspective view of the enclosure 10. The secure enclosure 10 has placed therein a first device 100 and a second device 200. The secure enclosure 10 may be in the form of a plastic bag. The plastic bag may be similar to a ZIPLOC (trademarked) bag or for example bags used as containers for EZPASS (trademarked) electronic devices for paying tolls in New York and New Jersey metropolitan area. Plastic bags with metal layers are used as containers for EZPASS devices to prevent payment by the EZPASS devices. The secure enclosure 10 may have an outer thin metal coating 12. The secure enclosure 10 may be comprised of a inner plastic material 14. The secure enclosure 10 may have a seal 16 which may run in a circular path around the inside of secure enclosure 10. The seal 16 may be of a ZIPLOC (trademarked) type.

Figure 3A:
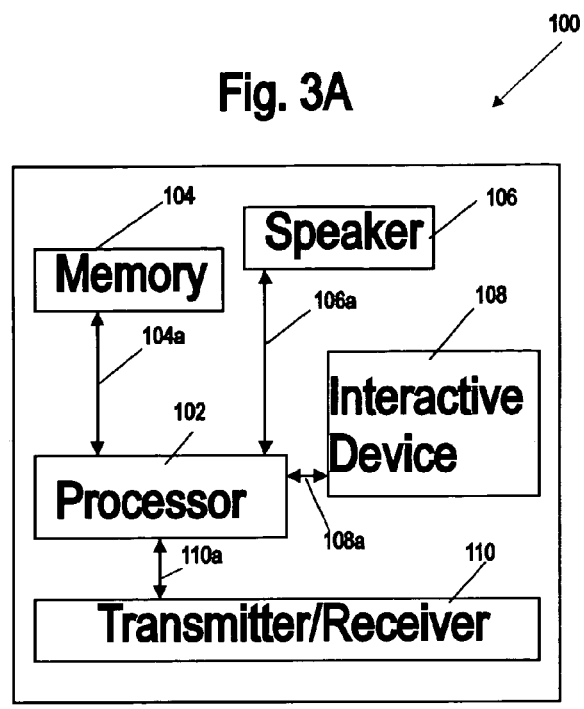
FIG. 3A is a simplified block diagram of the components of a first device which is placed in the enclosure of FIG. 1.
Figure 3B:
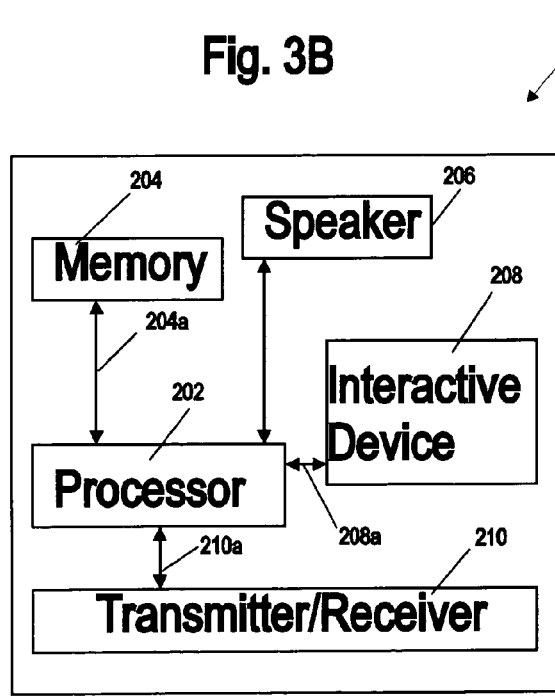
FIG. 3B is a simplified block diagram of the components of a second device which is placed in the enclosure of FIG. 1.

FIG. 3A is a simplified block diagram of components of a first device 100. The first device 100 includes a processor 102, a memory 104, an output device 106, an input device 108, and a transmitter/receiver 110. The processor 102 may be electrically connected through for example hardwiring or wireless communication to the memory 104, the output device 106, the input device 108, and the transmitter/receiver 110 by the busses 104a, 106a, 108a, and 110a respectively. FIG. 3B is a similar simplified block diagram of the components of the second device 200. The second device 200 includes a processor 202, a memory 204, a speaker 206, an interactive device 208, and a transmitter/receiver 210. The processor 202 may be electrically connected to the memory 204, the speaker 206, the interactive device 208, and the transmitter/receiver 210 by the busses 204a, 206a, 208a, and 210a respectively.

In operation, an individual sets the first device 100 to key exchange mode by entering a first set of data into the input device 108. The input device 108 may be a computer mouse, a keyboard, a speech recognition device, or any other interactive device and the first set of data may be typed in commands, speech commands, mouse clicks, or some other type of data. The individual would also set the second device 200 to key exchange mode by entering a second set of data into the interactive device 208. The interactive device 208 and the second set of data may be of the same type as the input device 108 and the first set of data, respectively.

After entering the first set and second set of data, the individual would place the first and second devices into the enclosure 10 and then seal the enclosure 10. The enclosure 10 is sealed by pressing portions 16a and 16b of the seal, shown in FIG. 2, together with each other, in the manner of a ZIPLOC (trademarked) storage plastic bag, in order to form an airtight sealed chamber within the enclosure 10 where the first device 100 and second device 200 are located. However, in some embodiments of the present invention a flap could be just folded over to close the enclosure and an airtight seal may not be required.

A timer may be triggered by the entry of either the first set of data, the second set of data, or both. The timer may cause a key exchange between the first device and the second device to occur a certain amount of time after the first and/or the second set of data is entered. The timer should be set to allow sufficient time for the individual to place the first device 100 and second device 200 into the enclosure 10 and to seal the enclosure 10. Setting the timer to twenty seconds may be sufficient. In an alternative embodiment a key or button on the first device 100 or the second device 200 could be pressed through the enclosure 10 to start the communication between the first device 100 and the second device 200. In addition, a button could be pressed through the enclosure 10 on either first device 100 or second device 200, which may cause the key exchange to be performed again, if the initial key exchange was for example, accidentally performed with the enclosure 10 open or partially open.

The key exchange between the first device 100 and the second device 200 may occur in the following manner. The processor 102 may transmit a first key exchange signal through transmitter/receiver 110 to the transmitter/receiver 210 of the device 200. The processor 202 of the device 200 may receive the first key exchange signal through the transmitter/receiver 210. The processor 202 may check this first key exchange signal versus data stored in memory 204. The processor 202 may send a second key exchange signal out via transmitter/receiver 210 to the transmitter/receiver 110 and thus to the processor 102 of the first device 100. The processor 102 may check the second key exchange signal versus data stored in memory 104. If the processor 102 finds the key exchange operation to be acceptable, it may cause an output from the output device 106, such as for example a sound if the output device 106 is a speaker or a vibration if the output device 106 is a device capable of vibrating. The processor 202 may likewise cause an output from the output device 206 if it finds the key exchange to be acceptable. The key exchange may involve several rounds of signals exchanged between the device 100 and the device 200.

The metal coating 12 on the enclosure 10 may cause no electromagnetic signals to escape from the enclosure 10 or may only prevent a particular range of frequencies of signals from escaping from the enclosure 10. The particular range should be the range at which the first and second device communicate. Thus, in either case, a third party device or individual cannot eavesdrop on the key exchange between the first device 100 and the second device 200.

After the key exchange is done in the enclosure 10, the first device 100 and the second device 200 can be taken out of the enclosure 10 and can communicate securely and in an authenticated manner outside the enclosure.

Figure 4A:
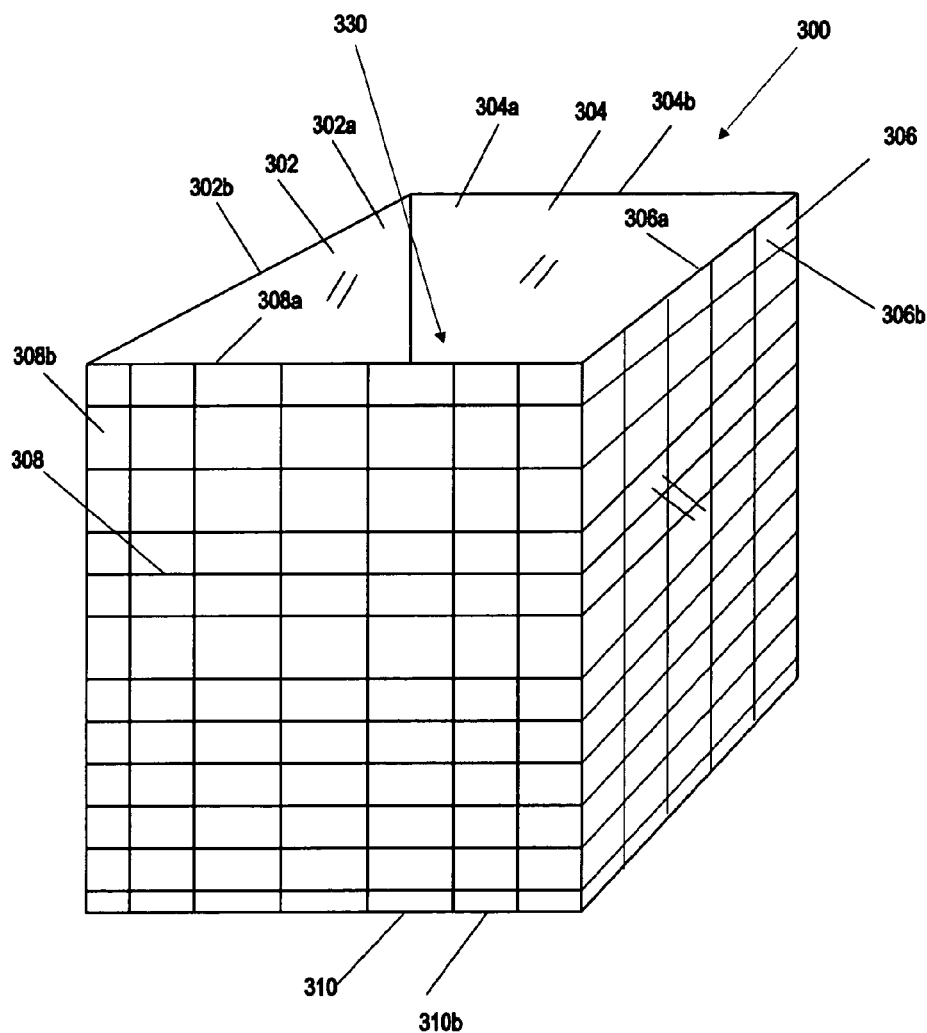
FIG. 4 shows a perspective view of a container of a second embodiment of the present invention.
Figure 4B:
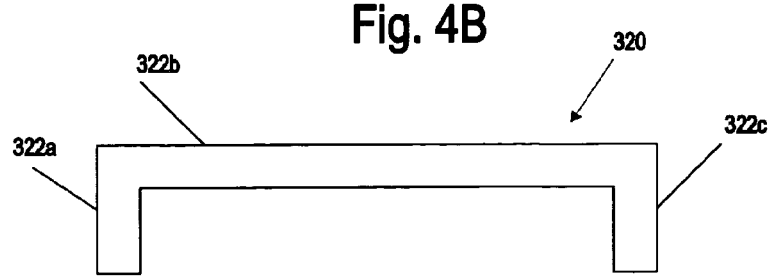

FIG. 4A shows a perspective view of a container 300 of a second embodiment of the present invention. The container 300 includes panels 302, 304, 306, and 308 and bottom panel 310. Each panel has an outer side which has a metal net. For example, panels 306 and 308 have outer sides 306b and 308b which include metal nets. The container 300 has a cover 320 shown in FIG. 4B, which has outer sides 322a, 322b, and 322c. The outer sides 322a, 322b, and 322c may each include a metal net like the metal net on outer sides 306b and 308b. The cover 320 may be placed on top of the container 300 to completely enclose and seal the chamber 330 within the container 300 and the cover 320.

The panels 302, 304, 306, 308, 310, and 320 may be made of glass or transparent plastic with the exception of a metal net material placed on the outer sides 302b, 304b, 306b, 308b, and 322a–c. Metal net material may be interspersed inside the panels 302, 304, 306, 308, 310, and 320. The metal net material may be similar to that of a microwave oven, since the same bandwidth is employed for a microwave oven as for a Bluetooth device. Bluetooth devices typically emit frequencies in the range of 2.400 to 2.4835 Gigahertz in the United States, in the range of 2.445 to 2.475 Gigahertz in Spain, and in the range of 2.4465 to 2.4835 Gigahertz in France.

The approximate bandwidth of frequencies that the metal net material prevents from escaping may be about the same as the bandwidth that a microwave oven prevents from escaping. This bandwidth will depend on the size of holes in the net material. An individual can verify that the container 300 and cover 322 is secure merely by checking the structure of the container 300.

Similar to the embodiment of FIG. 1, in operation an individual may activate two devices, such as device 100 and device 200, place the devices 100 and 200 into the container 300, and then cover the container with the cover 320. The devices 100 and 200 may have timing mechanisms which cause them to perform a key exchange after the chamber 330 of the container 300 has been sealed by the cover 320. After the key exchange has been performed, the devices 100 and 200 may be taken out of the container 300 and may communicate securely and in an authenticated manner outside the container 300 since they have exchanged a key.

Figure 5:
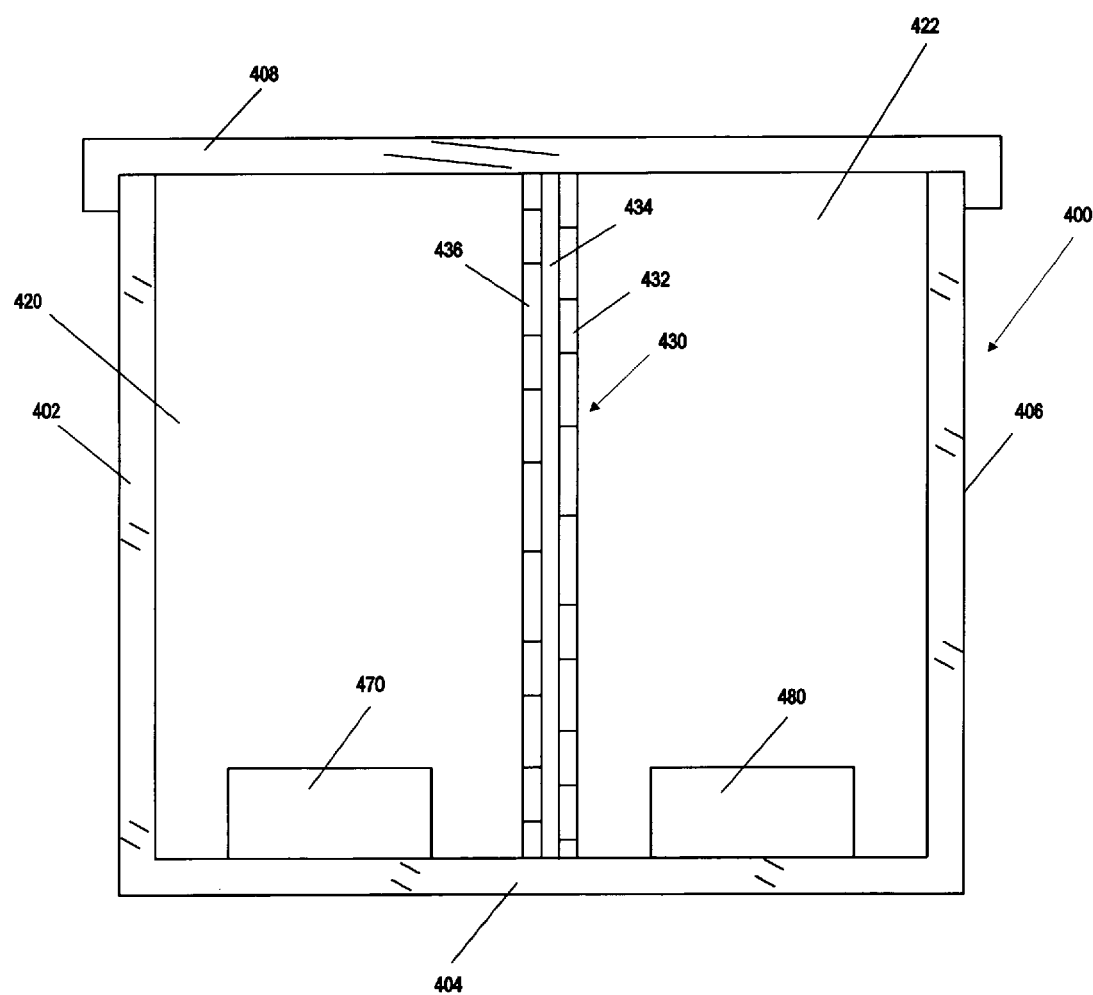
FIG. 5 shows a cross-sectional view of a container of a third embodiment of the present invention which includes a door.

FIG. 5 shows a cross-sectional view of a container 400 and a cover 408 of a third embodiment of the present invention. The container 400 includes side 402, side 406, and bottom 404. The cover 408, sides 402 and 406 and bottom 404 may include metal net material similar to that of FIG. 4A and FIG. 4B. The container 400 also includes a door 430 which includes a metal portion 432, a solid portion 434, and a metal net portion 436. The door 430 devices the container 400 into portions chambers 420 and 422. Also shown in FIG. 5 are devices 470 and 480 which may be similar to devices 100 and 200 of FIG. 1.

Figure 6:
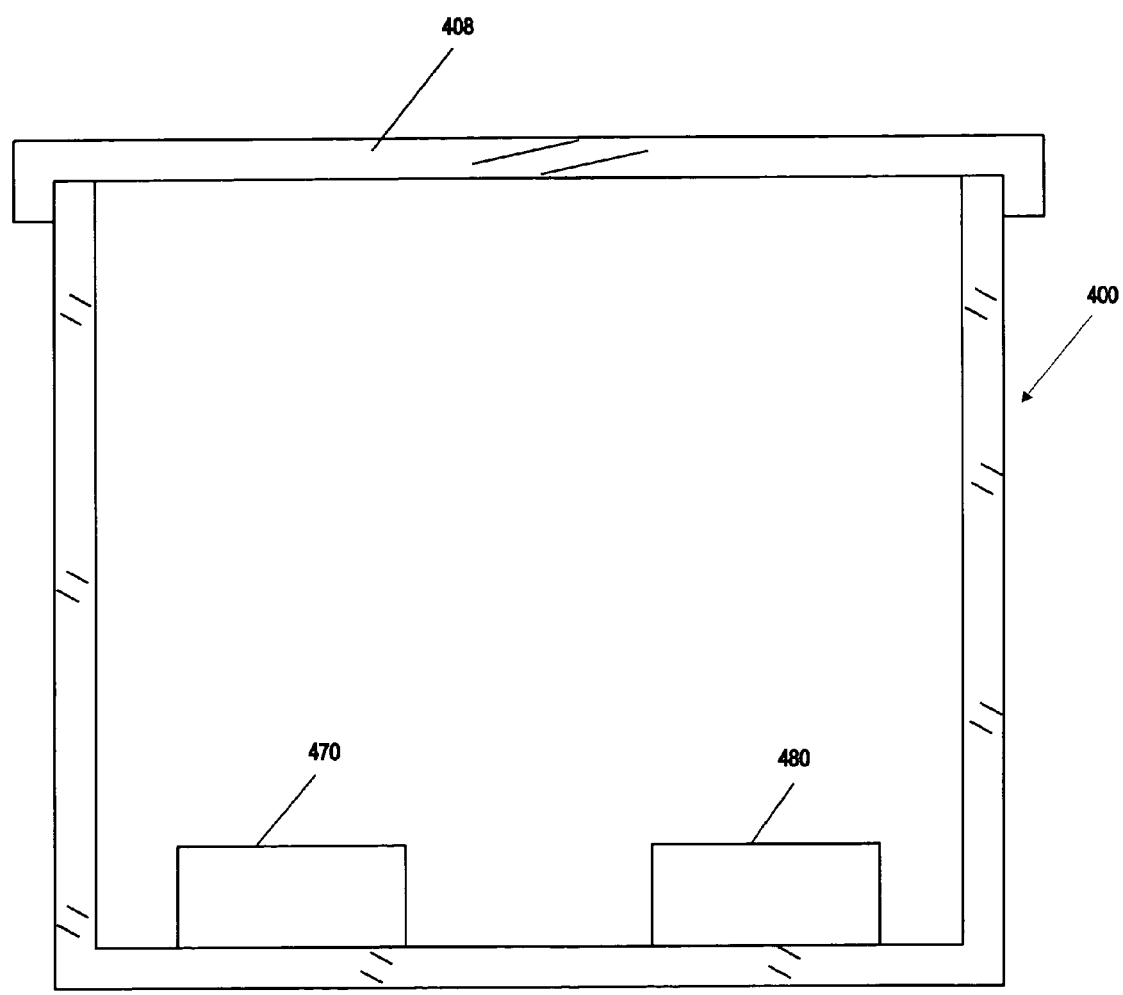
FIG. 6 shows a cross section of the container of FIG. 5 after the door has been opened.
Figure 7:
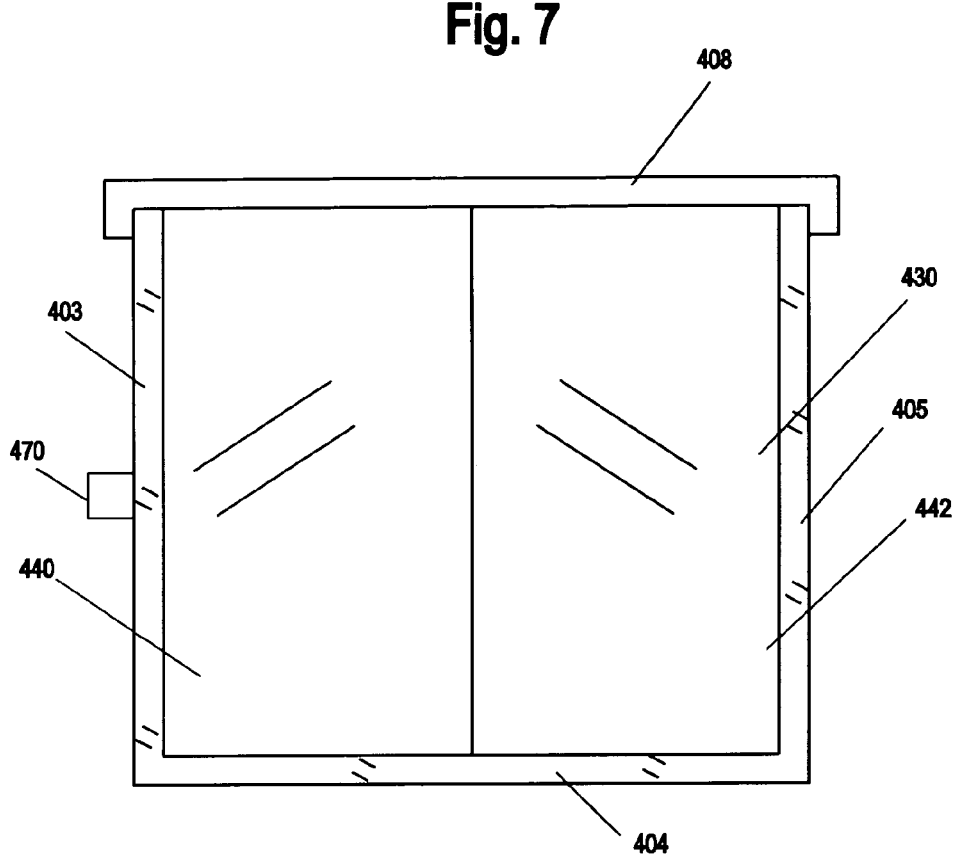
FIG. 7 shows another cross-sectional view (from a different view from FIGS. 5 and 6) of the container of FIG. 5 with the door closed.
Figure 8:
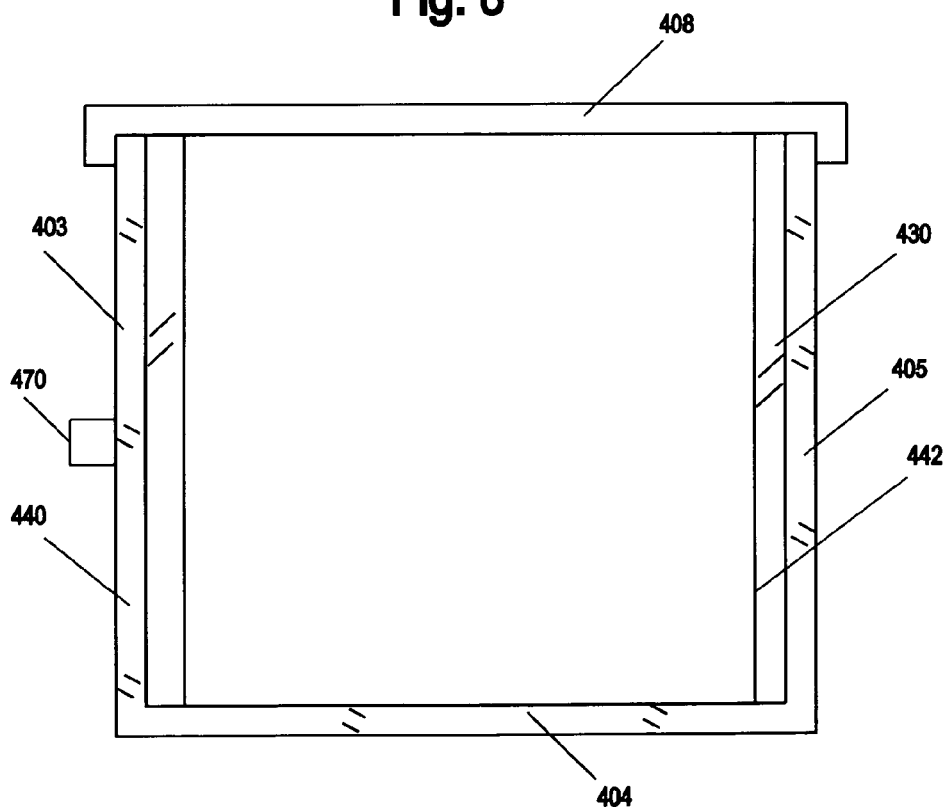
FIG. 8 shows another cross-sectional view of the container of FIG. 5, from the same perspective as in FIG. 7, only with the door open.

In operation, places device 470 into chamber 420 and device 480 into chamber 422. The user then places the cover 408 over the container 400 in the position shown in FIG. 5. The user would then cause the door 430 to open to allow the devices 470 and 480 to communicate with one another. FIG. 6 shows a cross section of the container 400 after the door 430 has been moved out of the way. FIG. 7 shows another cross sectional view (from a different view from FIGS. 5 and 5) of the container 400 with the door 430 closed. FIG. 7 shows side 403 and 405 of the container 400 which were not visible in FIGS. 5 and 6. FIG. 7 also shows portions 440 and 442 of the door 430. FIG. 8 shows another cross sectional view of the container 400, from the same perspective as in FIG. 7, only with the door 430 open. Portion 440 of the door 430 is shown against the side 403 and portion 442 of the door 430 is shown against the side 405. FIGS. 7 and 8 also show a switch 470 for causing the door 430 to open.

Figure 9:
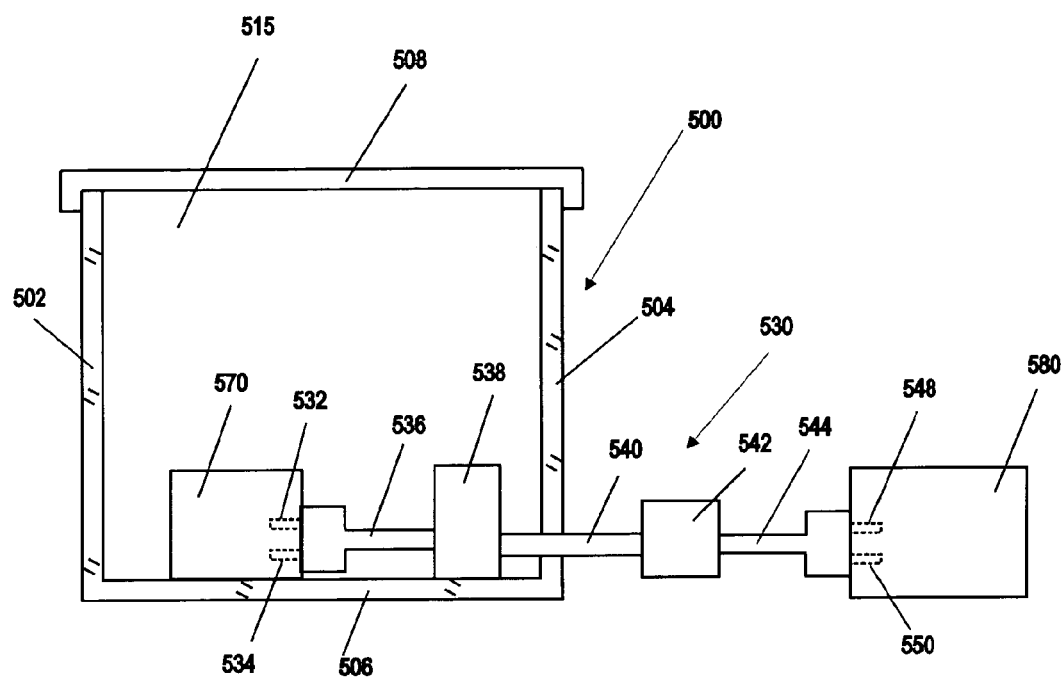
FIG. 9 shows a block diagram of another embodiment of the present invention wherein a device inside a container and a cover is electrically connected by a cable device to a device outside the container.

FIG. 9 shows a container 500 and cover 508 which includes a device 570 enclosed therein which is electrically connected by a cable device 530 to a device 580 outside the container 500. The container 500 includes sides 502, 504, and 506. The container 500 and cover 508 may include metal net material similar to previous embodiments. The cable device 530 may include lead lines 532 and 534 which are connected to the device 570, cable portion 536, Bluetooth transmitter 538, cable portion 540, switch 542, cable portion 544, and leads 548 and 550. The leads 548 and 550 plug into the device 580. The cable portion 540 may fit snugly through a hole in the container 500 so that there is no leakage from the chamber 515 within the enclosed container 500 and cover 508.

In operation, an individual would plug the device 570 into the leads 532 and 534, and then close the chamber 515 by placing the cover 508 over the chamber 515. The individual would then plug the device 580 into the leads 548 and 550. The devices 570 and 580 could then communicate with one another. The device 580 may alternatively be set in a standby mode and plugged into leads 548 and 550. The device 570 may then thereafter be inserted into the container 500. The switch 542 may be used to start the key exchange or the communication between devices 570 and 580.

Figure 10:
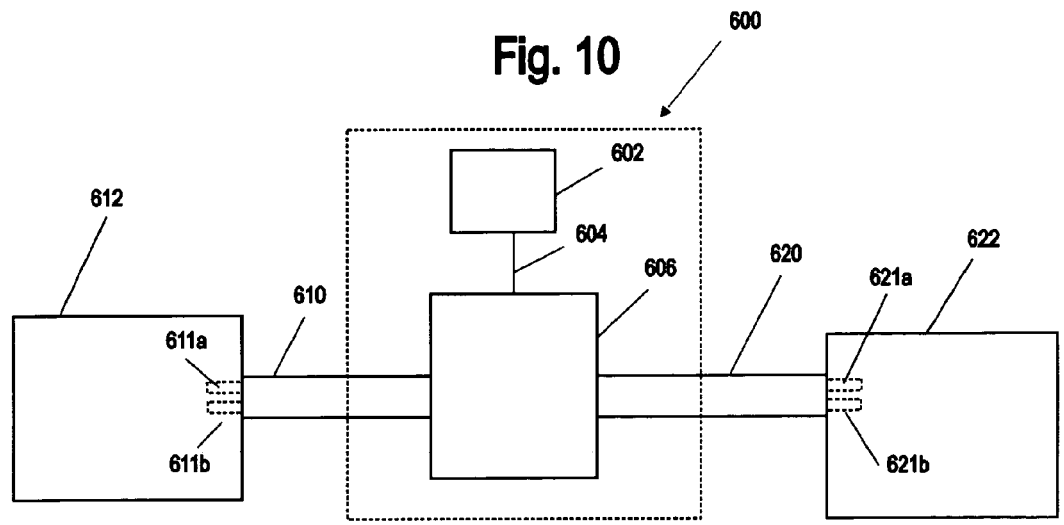
FIG. 10 shows a portable device for performing a secure key exchange in accordance with another embodiment of the present invention.

FIG. 10 shows a portable device 600 for performing a secure key exchange. The portable device 600 includes a power supply 602 connected by line 504 to a Bluetooth transmitter 606. The Bluetooth transmitter 606 is electrically connected to device 612 through cable 610 and leads 611a and 611b. Bluetooth transmitter 606 is electrically connected to device 622 through cable 620 and leads 621a and 621b.

The devices 612 and/or 622 may be too large to put into a container to perform a key exchange as in the previous embodiments. In operation the portable device 600 can be transported to the location of the device 612, for example, and plugged into the device 612 by plugging cable 610 into the device 612. The device 600 may also be plugged into the device 622 by plugging cable 620 into the device 622. The device 612 may be immobile and the device 622 may be mobile.

Figure 11A:
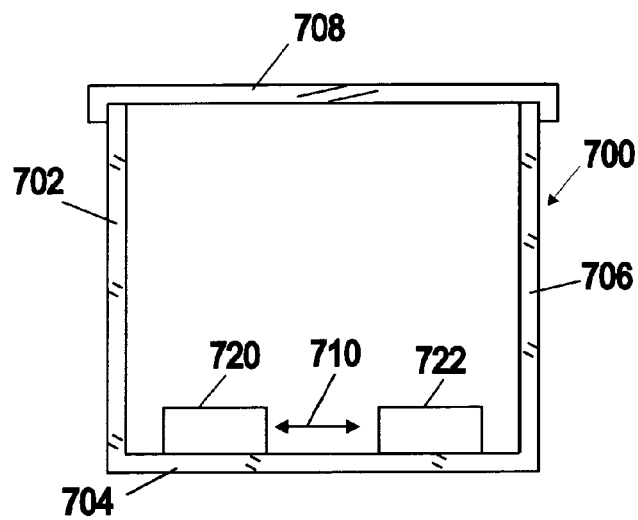
FIGS. 11A and 11B show another embodiment of the present invention where a portable device having a shape and/or function similar to a floppy disc or PCMCIA card can be used.

FIG. 11A shows a cross section of a container 700 including sides 702 and 706 and bottom 704 and a cross section of a cover 708. The container 700 and cover 708 may be similar to that shown in FIG. 6. Devices 720 and 722 are also shown in FIG. 11A. The devices 720 and 722 can communicate with each other via wireless channel 710. The device 720 may have the shape of a floppy disc or a PCMCIA card ("PCMCIA" stands for "personal computer modem computer input access" card). FIG. 11A shows the first mode of operation of the device 720. Devices 720 and 722 each includes a Bluetooth device which is integrated in each of devices 720 and 722. In the first mode of operation, the device 720 locates device 722 and performs a key exchange in the secure enclosure of container 700 with cover 708.

Figure 11B:
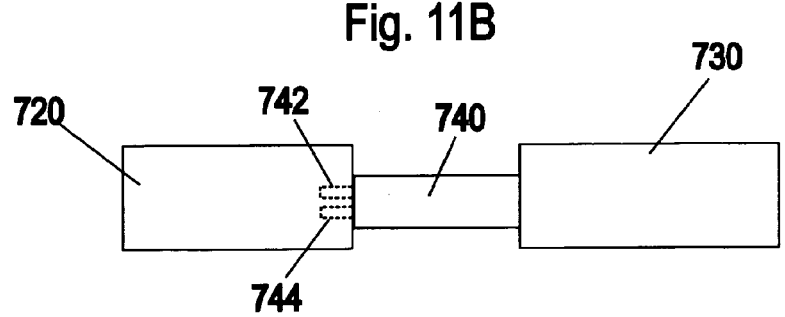

FIG. 11B shows a second mode of operation of the device 720. The device 720 communicates the key (previously obtained from the first mode) to device 730 which is connected to device 720 by means of leads 742 and 744 and cable 740. The device 730 may, for example, be a disc drive (if, for example, device 720 is a device which has a form factor similar to a floppy disc so that it can be inserted into a floppy disc drive and can be read by a floppy disc drive) or the device 730 may be a PCMCIA port (if device 720 is a PCMCIA card). Other embodiments, fitting a parallel or serial port may also be used.

I claim:
1. A method comprising:
placing a first device in an enclosure;
placing a second device in the enclosure; and
the enclosure is comprised of a first and second compartment, wherein the first and second compartment are separated by a separation device; and placing the first device in the first compartment and the second device in the second compartment;
sealing the enclosure while the first device and the second device are in the enclosure;
causing the first device to exchange a key with the second device while the first device and the second device are in the enclosure and while the enclosure is sealed;
removing the first device and the second device from the enclosure after the key exchange; and
using the key to allow the first device and the second device to communicate with each other using methods of encryption;
wherein the enclosure is coated with a filtering material, wherein the filtering material of the enclosure prevents electromagnetic radiation of a particular bandwidth from escaping from the enclosure.

2. The method of claim 1 wherein using the key to allow the first device and the second device to communicate with each other using methods of authentication outside the enclosure.

3. The method of claim 1 wherein
the first device is electronic; and
the second device is electronic.

4. The method of claim 1 wherein the enclosure is a plastic bag coated with the filtering material.

5. The method of claim 1 wherein the filtering material is comprised of metal.

6. The method of claim 1 wherein the enclosure is a container having sides comprised of the filtering material.

7. The method of claim 6 wherein the filtering material is comprised of metal.

8. The method of claim 6 wherein the enclosure is comprised of glass and the filtering material is attached to the glass.

9. The method of claim 6 wherein the enclosure is comprised of plastic and the filtering material is attached to the plastic.

10. The method of claim 1 wherein the separation device when closed prevents the first device from communicating with the second device; and
the separation device when opened allows the first device to communicate with the second device.

11. The method of claim 10 wherein the separation device is comprised of a door which can be opened after the enclosure is sealed.

12. The method of claim 11 wherein the separation device is comprised of a filtering material.

13. A method comprising steps of:
placing a first device into an enclosure;
connecting the first device to a transmitter, wherein the transmitter is connected to a first end of a cord device the first end of the cord device being inside the enclosure;
sealing the enclosure while the first device is in the enclosure and while the first device is connected to the transmitter;
wherein the cord device has a second end which is outside the enclosure; and wherein the method further comprised of connecting a second device which lies outside the enclosure, to the second end of the cord device; and
after connecting the first device to the first end of the cord device and after connecting the second device to the second end of the cord device, causing the first device to exchange a key with the second device while the first device is in the sealed enclosure;
removing the first device from the enclosure after the key exchange; and
using the key to allow the first device and the second device to communicate with each other using methods of encryption with the first device outside of the enclosure.

14. The method of claim 13 wherein the cord device is comprised of an electrical cord.

15. The method of claim 13 wherein the cord device is comprised of an optical cable.

16. The method of claim 13 wherein the cord device is comprised of a radio transmitter.

17. The method of claim 13 wherein the transmitter is a Bluetooth transmitter.

18. An apparatus comprising:
means for causing a first device to exchange a key with a second device; and
means for preventing a third device from determining a key which is exchanged between the first device and the second device, and
wherein the means for preventing the third device from determining the key is comprised of an enclosure having a filtering material;
wherein the enclosure is adapted to that it can completely surround both the first device and the second device in order to prevent the third device from determining the key.

19. The apparatus of claim 18 wherein the enclosure is adapted so that the first and second devices can be simultaneously placed into the enclosure and the enclosure can be sealed.

20. The apparatus of claim 18 wherein the first and second devices exchange the key in a wireless manner.

21. The method of claim 1 wherein a timer causes the first device to exchange the key with the second device while the first device and the second device are in the enclosure and while the enclosure is sealed.

22. The method of claim 1 wherein the first device emits a sound after the first device successfully exchanges the key with the second device.

23. The method of claim 1 wherein the first device vibrates after the first device successfully exchanges the key with the second device.

24. The apparatus of claim 18 wherein the means for causing a first device to exchange a key with a second device includes a timer.

25. The apparatus of claim 18 further comprising
a button that is located on the first device; and
wherein the button can be pressed to cause the first device to exchange the key with the second device while the first device and the second device are in the enclosure and while the enclosure is sealed.

26. The apparatus of claim 18 wherein the first device emits a sound after the first device successfully exchanges the key with the second device.

27. The apparatus of claim 18 wherein the first device vibrates after the first device successfully exchanges the key with the second device.

* * * * *